US012583148B2

(12) United States Patent
Al-Muslim

(10) Patent No.: US 12,583,148 B2
(45) Date of Patent: Mar. 24, 2026

(54) ARTIFICIAL NAIL MEASUREMENT SYSTEM AND METHOD

(71) Applicant: Elham Al-Muslim, McDonough, GA (US)

(72) Inventor: Elham Al-Muslim, McDonough, GA (US)

( * ) Notice: Subject to any disclaimer, the term of this patent is extended or adjusted under 35 U.S.C. 154(b) by 435 days.

(21) Appl. No.: 17/225,100

(22) Filed: Apr. 7, 2021

(65) Prior Publication Data

US 2022/0322809 A1      Oct. 13, 2022

Related U.S. Application Data

(60) Provisional application No. 63/006,291, filed on Apr. 7, 2020.

(51) Int. Cl.
| | |
|---|---|
| *B29C 33/38* | (2006.01) |
| *A45D 31/00* | (2006.01) |
| *B29C 39/02* | (2006.01) |
| *G06Q 50/04* | (2012.01) |
| *A45D 29/22* | (2006.01) |
| *B29L 31/00* | (2006.01) |

(52) U.S. Cl.
CPC .......... *B29C 33/3857* (2013.01); *A45D 31/00* (2013.01); *B29C 39/026* (2013.01); *G06Q 50/04* (2013.01); *A45D 29/22* (2013.01); *B29C 2033/3871* (2013.01); *B29L 2031/702* (2013.01)

(58) Field of Classification Search
None
See application file for complete search history.

(56) References Cited

U.S. PATENT DOCUMENTS

| | | | | | |
|---|---|---|---|---|---|
| 4,361,160 | A | * | 11/1982 | Bryce | A45D 31/00 132/73 |
| 6,888,956 | B2 | * | 5/2005 | Muramatsu | G06V 40/1394 382/125 |
| 7,123,983 | B2 | * | 10/2006 | Yogo | A45D 31/00 700/161 |
| 7,526,416 | B2 | * | 4/2009 | Nielson | G06T 17/00 703/1 |
| 2002/0076089 | A1 | * | 6/2002 | Muramatsu | G06V 40/40 382/124 |

(Continued)

OTHER PUBLICATIONS

Weise, E., "The dead can unlock iPhones, offering possible clues to a killer's plan after memories go," USA Today (Online) [ Arlington] Nov. 10, 2017. (Year: 2017).*

*Primary Examiner* — Nicholas D Rosen
(74) *Attorney, Agent, or Firm* — Incorporating Innovation LLC; Charlena Thorpe, Esq.

(57) ABSTRACT

Implementations of an artificial nail measurement system and method ("artificial nail measurement") are provided. In some implementations, the artificial nail measurement may comprise a mold casting kit. In some implementations, the artificial nail measurement may further comprise a mold extraction kit.

In some implementations, a method for the artificial nail measurement comprises a user receiving and using a mold casting kit to form a mold of the user's fingernails, shipping the mold to a nail technician to form a cast or replica of the user's fingernails, and the nail technician using the cast to measure the user's fingernails to select from pre-made artificial nails that then designed and shipped to the user for use.

1 Claim, 2 Drawing Sheets

(56)      References Cited

U.S. PATENT DOCUMENTS

| | | | |
|---|---|---|---|
| 2004/0143359 A1* | 7/2004 | Yogo ..................... | A45D 31/00 |
| | | | 700/161 |
| 2005/0268931 A1* | 12/2005 | Chang ................... | A45D 31/00 |
| | | | 132/73 |
| 2006/0034507 A1* | 2/2006 | Nielson ................... | G06T 7/50 |
| | | | 382/154 |
| 2006/0036415 A1* | 2/2006 | Nielson ................. | A45D 31/00 |
| | | | 703/2 |
| 2007/0057403 A1* | 3/2007 | Nielson ................. | A45D 31/00 |
| | | | 264/222 |
| 2007/0059394 A1* | 3/2007 | Nielson .............. | B29C 33/3857 |
| | | | 425/2 |
| 2009/0092310 A1* | 4/2009 | Gifford ................... | A61K 8/00 |
| | | | 382/141 |
| 2011/0087351 A1* | 4/2011 | Sachdeva .............. | A45D 31/00 |
| | | | 700/118 |

* cited by examiner

ARTIFICIAL NAIL MEASUREMENT SYSTEM AND METHOD

CROSS REFERENCE TO RELATED APPLICATION

This application claims the benefit of U.S. Patent Application Ser. No. 63/006,291, which was filed on Apr. 7, 2020, and is incorporated herein by reference in its entirety.

TECHNICAL FIELD

This disclosure relates to implementations of an artificial nail measurement system and method.

BACKGROUND

Artificial fingernails (or artificial nails) are very popular. Such custom artificial nails typically have to be obtained as a service from a nail salon or nail technician or similar public place away from home. This requires a customer to leave home and travel, use up time (e.g., waiting to be served), and be exposed (e.g., to virus) in-person in a public place. The customer is matched to pre-made artificial nails by selecting a pre-made artificial nail and then placing it against the customer's nail to see if it matches. This is typically done with each nail or one or nails. FIG. 1 shows a group of pre-made artificial nail of varying sizes. There does not exist a simple, inexpensive, time efficient, and safe alternative to obtaining artificial nails that fit a customer's figures and designing artificial nails in-person at a nail salon or similar provider.

DETAILED DESCRIPTION

Implementations of an artificial nail measurement system and method ("artificial nail measurement") are provided. In some implementations, the artificial nail measurement may comprise a mold casting kit. In some implementations, the artificial nail measurement may further comprise a mold extraction kit.

In some implementations, the artificial nail measurement is configured to allow for artificial nails to be ordered and received by a user in the convenience of the user's home (or similar location).

In some implementations, the artificial nail measurement is configured to allow a user to obtain artificial nails based on measurements obtained for a cast made from a mold made by the user at home and mailed to a nail technician. The nail technician masks a cast from the mold to determine the user's nail measurements and selects the best or closest fit from a group of existing artificial nails. The nail technician custom designs the artificial nails to the user's requests and mails the artificial nails to the user.

In this way, in some implementations, the artificial nail measurement allows a user, such as a nail salon customer, to obtain artificial nails based on the user's nail measurements and custom designed from the user's requests without the user having to leave home or having in-person contact with a nail salon technician or others.

Furthermore, in this way, in some implementations, the artificial nail measurement provides a user with a simple, inexpensive, time efficient, and safe alternative to obtaining artificial nails in-person at a nail salon or similar provider.

Moreover, in this way, in some implementations, the artificial nail measurement provides such features to user who are unable, e.g. due to health conditions, lack of available time, etc., to make an in-person visit to obtain custom artificial nails.

In some implementations, a method for the artificial nail measurement comprises a user receiving and using a mold casting kit to form a mold of the user's fingernails, shipping the mold to a nail technician to form a cast or replica of the user's fingernails, and the nail technician using the cast to measure the user's fingernails. The nail technician then selects artificial nails from a group of pre-made artificial nails of varying sizes that are the closest in measurement to the measured sizes, respectively. The artificial nails are custom designed and then shipped to the user for use.

In some implementations, the artificial nail measurement system may comprise a mold casting kit. In some implementations, the artificial nail measurement may further comprise a mold extraction kit. In some implementations, the customer receives the mold casting kit and the nail technician receives the mold extraction kit. In some implementations, the artificial nail measurement may further comprise any other suitable components.

Figure 1:
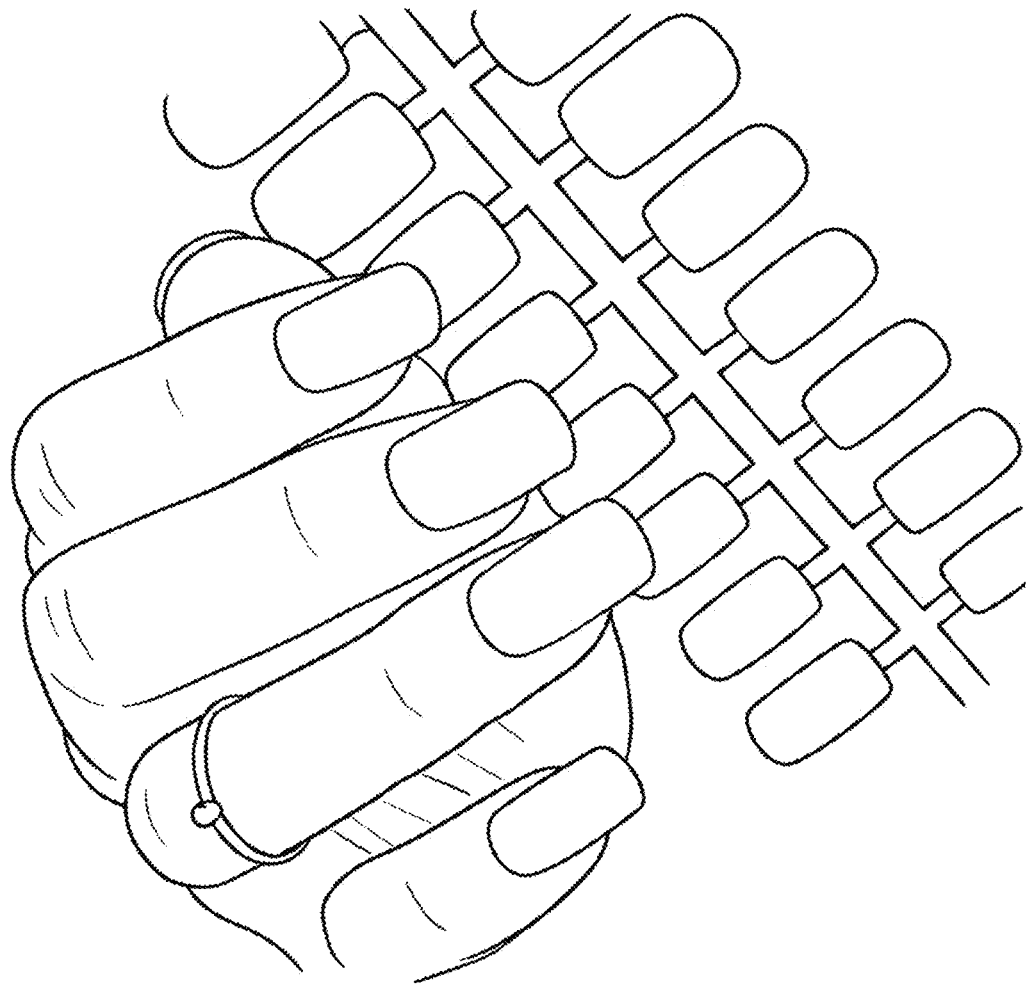
FIG. 1 illustrates pre-made artificial nails of varying sizes.
Figure 2:
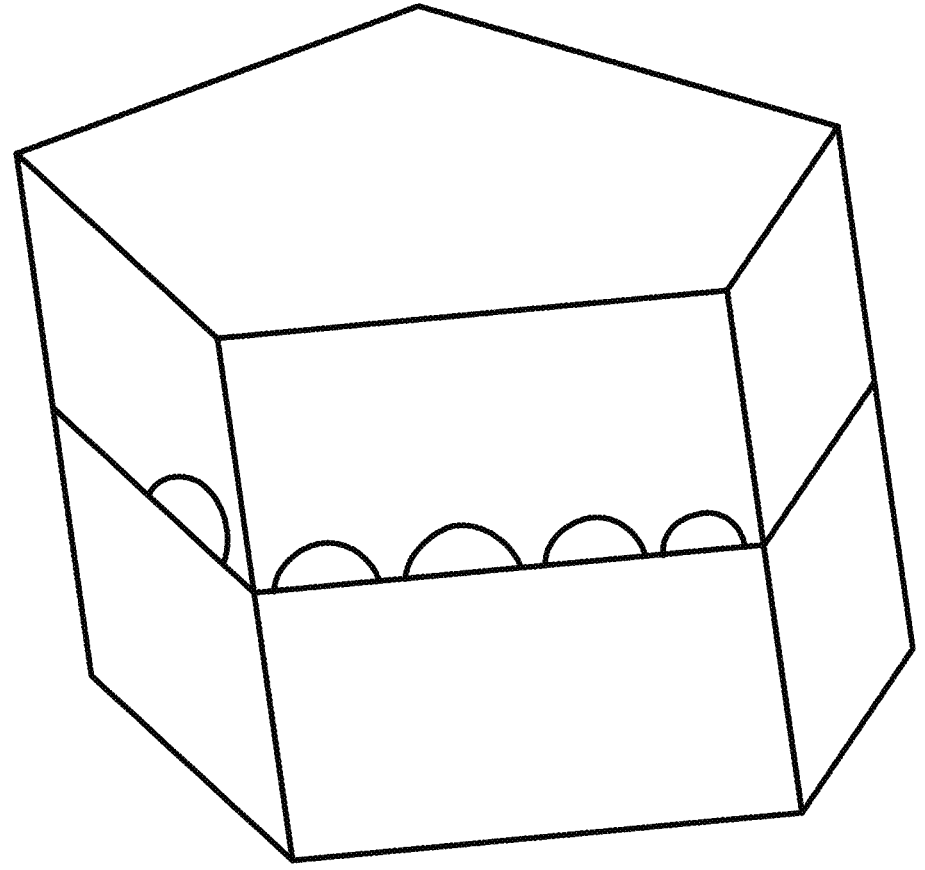
FIG. 2 illustrates an example mold casting container according to an implementations of the present invention.

In some implementations, the mold casting kit may comprise a mold casting compound. In some implementations, the mold casting kit may further comprise a mold casting box. FIG. 2 illustrates an example of a mold casting box. In some implementations, the mold casting kit may further comprise directions or instructions to use the mold casting kit, such as the mold casting compound and/or the mold casting box.

In some implementations, the mold casting kit may further comprise any other suitable components.

In some implementations, the mold casting compound comprises a two-part silicone compound. In some implementations, the two-part silicone compound is configured such that the compound can mixed for use by a user.

In some implementations, the mold casting compound may comprise any other suitable existing or future developed compound and/or other suitable component, as will be recognized by one skilled in the art based on the present disclosure.

In some implementations, the mold casting box comprises a box or case having two sides or sections (e.g., a top and a bottom). In some implementations, the sides of the mold casting box are hinged or otherwise suitably connected together such that mold casting box can be at least partly opened and closed. In some implementations, the box has openings for the user's fingers.

In some implementations, the mold casting box is sized and shaped such that a user can insert the user's fingertips (or other suitable finger portions) into the mold casting box to make a mold of the user's fingernails.

In some implementations, the mold casting box is configured to receive the mold casting compound such that the user can make a mold of the user's fingernails. For example, in some implementations, one or both the sides of the mold casting box are configured to receive the mold casting compound therein.

In some implementations, the mold casting box is configured such that mold casting box can be at least partly closed with the user's fingertips (or other suitable finger portions) inserted such that a mold of the user's fingertips can be molded in the mold casting compound.

In some implementations, the mold casting box may comprise any other suitable existing or future developed enclosure and/or other suitable component, as will be recognized by one skilled in the art based on the present disclosure.

In some implementations, the mold extraction kit comprises a mold extraction compound. In some implementations, the mold extraction kit may further comprise any other suitable components.

In some implementations, the mold extraction compound comprises a rubber or resin compound. In some implementations, the mold extraction compound may be a two-part mixable compound.

In some implementations, the mold extraction compound may be pourable. In some implementations, the mold extraction compound may be liquid.

In some implementations, the mold extraction compound may comprise any other suitable existing or future developed compound and/or other suitable component, as will be recognized by one skilled in the art based on the present disclosure.

In some implementations, the mold extraction compound is configured to be poured into the mold casting box containing a mold of a user's fingernails formed in the mold casting compound. In some implementations, the mold extraction compound is configured to cure and form a cast or replica of the user's fingernails from the mold in the mold casting box.

In some implementations, the formed cast may include the nail bed and/or walls of the user's fingertips. In some implementations, the formed cast may include any other suitable features of the user's fingertips.

In some implementations, the mold extraction compound is configured such that the cured cast of the user's fingernails can be removed from the mold casting box. In some implementations, the mold extraction compound is configured such that the cured cast of the user's fingernails can be used (e.g., by a nail technician) to measure the user's fingernails, fingertips, fingernail bed etc. to select from a group of pre-made artificial fingernails (or artificial nails) the closest measurement.

In some implementations, the artificial nail measurement is configured to allow for artificial nails to be ordered and received by a user in the convenience of the user's home (or similar location).

In some implementations, the artificial nail measurement is configured to allow a user to obtain artificial nails based on a mold made by the user at home and mailed to a nail technician to determine the user's nail measurements, custom design the artificial nails to the user's requests, and mail the artificial nails to the user.

In this way, in some implementations, the artificial nail measurement allows a user, such as a nail salon customer, to obtain artificial nails based on the user's nail measurements and custom designed from the user's requests without the user having to leave home or having in-person contact with a nail salon technician or others.

Furthermore, in this way, in some implementations, the artificial nail measurement provides a user with a simple, inexpensive, time efficient, and safe alternative to obtaining custom designed pre-made artificial nails in-person at a nail salon or similar provider.

Moreover, in this way, in some implementations, artificial nail measurement provides such features to user who are unable, e.g. due to health conditions, lack of available time, etc., to make an in-person visit to obtain custom artificial nails.

In some implementations, components of the artificial nail measurement comprise any suitable dimensions.

In some implementations, components of the artificial nail measurement are composed of any suitable materials.

In some implementations, components of the artificial nail measurement can have any suitable appearance.

In some implementations, an example method for the artificial nail measurement comprises a user receiving the mold casting kit by mail or other suitable shipping. In some implementations, the user receives the mold casting kit in response to an order or similar request (e.g., to a nail salon) to obtain custom artificial fingernails (or artificial nails).

In some implementations, the method comprises the user using the mold casting kit to prepare a mold of the user's fingernails, fingertips, etc. For example, in some implementations, the method comprises the user mixing the mold casting compound. In some implementations, the method comprises the user placing the mold casting compound in one or both sides of the mold casting box.

In some implementations, the method comprises the user placing the user's fingertips into the mold casting compound in the mold casting box. In some implementations, the user may insert the user's fingertips up to the second knuckle. In some implementations, the user may insert any other suitable extent of the user's fingertips.

In some implementations, the method comprises the user holding the user's fingertips in the mold casting compound within the mold casting box until a mold is formed. In some implementations, the mold casting box is at least partly closed. In some implementations, the mold may be formed in approximately twenty minutes. In some implementations, the mold may be formed in less than or more than twenty minutes.

In some implementations, the method comprises the user removing the user's fingertips from the mold casting box after the mold is formed.

In some implementations, the method comprises the user mailing or otherwise shipping the mold in the mold casting box to a nail technician or other suitable person to provide custom designed pre-made artificial nails. In some implementations, the user may use packaging, shipping labeling, etc. provided with the mold casting kit.

In some implementations, the method comprises a nail technician or other suitable person receiving the mold casting box sent by the user.

In some implementations, the method comprises the nail technician forming a cast or replica of the user's fingernails, fingertips, etc. from the mold in the mold casting box. In some implementations, the cast is formed by pouring the mold extraction compound of the mold extraction kit into the mold casting box. In some implementations, the mold casting box is at least partly closed while receiving the mold extraction compound.

In some implementations, the method comprises allowing the mold extraction compound to cure and form the cast. In some implementations, the method comprises removing the cast from the mold casting box. In some implementations, the cast includes the nail bed and/or walls of the user's fingertips. In some implementations, the cast may include any other suitable features of the user's fingertips.

In some implementations, the method comprises the nail technician using the user's cast to determine measurements of the user's fingernails, fingertips, etc. to select from a group of pre-made artificial nails. In some implementations, the measurements are used by the technician to select pre-sized artificial nails.

In some implementations, the method comprises the nail technician custom designing (e.g., the color and/or other suitable feature) the selected artificial nails to meet the user's request, preference, etc.

In some implementations, the method comprises the nail technician mailing or otherwise shipping the finished custom artificial nails to the user. In some implementations, the technician may also send the user accessories such as adhesive or adhesive pads to allow the user to attach the artificial nails to the user's nail.

It will be understood by one skilled in the art based on the present disclosure that the above described method for the artificial nail measurement may be performed using components of the artificial nail measurement described herein or any other suitable existing or future developed components.

The figures, including photographs and drawings, comprised herewith may represent one or more implementations of the artificial nail measurement system and method.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A method of selecting one or more artificial nails based on one or more measurements obtained from a custom cast of one or more fingers of an end-user from a group of existing artificial nails, wherein the group of existing artificial nails are of varying sizes, the method comprising:

receiving at a first location a molding kit, wherein the molding kit comprises a hinged mold casting container and mold making material, wherein the hinged mold casting container comprises a first receptacle and a second receptacle connected at a hinge, wherein the first and second receptacle are configured to receive the mold making material for making a mold of the one or more fingers of the end-user;

preparing the mold making material and placing it in the first and second-receptacles;

placing the bottom of the one or more fingers of the end-user on top of the mold making material in the first receptacle and closing the second receptacle on top of the one or more fingers of the end-user to make a mold of the one or more fingers of the-end-user;

once the mold is set, removing the one or more fingers and closing the hinged mold casting container to prepare for shipping the hinged mold casting container;

receiving at a second location the hinged mold casting container;

receiving at the second location cast making material to make a cast from the mold made from the hinged mold casting container;

pouring the cast making material into the hinged mold casting container to make a cast of the one or more fingers of the end-user;

measuring portions of the fingernail bed of each finger of the one or more fingers of the end-user; and comparing, for each measurement, the measured finger with the measurements of the group of existing artificial nails and selecting the existing artificial nail from the group that is the closest in measurement, decorating the selected artificial nail and shipping the artificial nail to the first location or a third location.

* * * * *